March 16, 1926.
F. PALFY
MIXING VALVE
Filed March 21, 1925
1,577,355
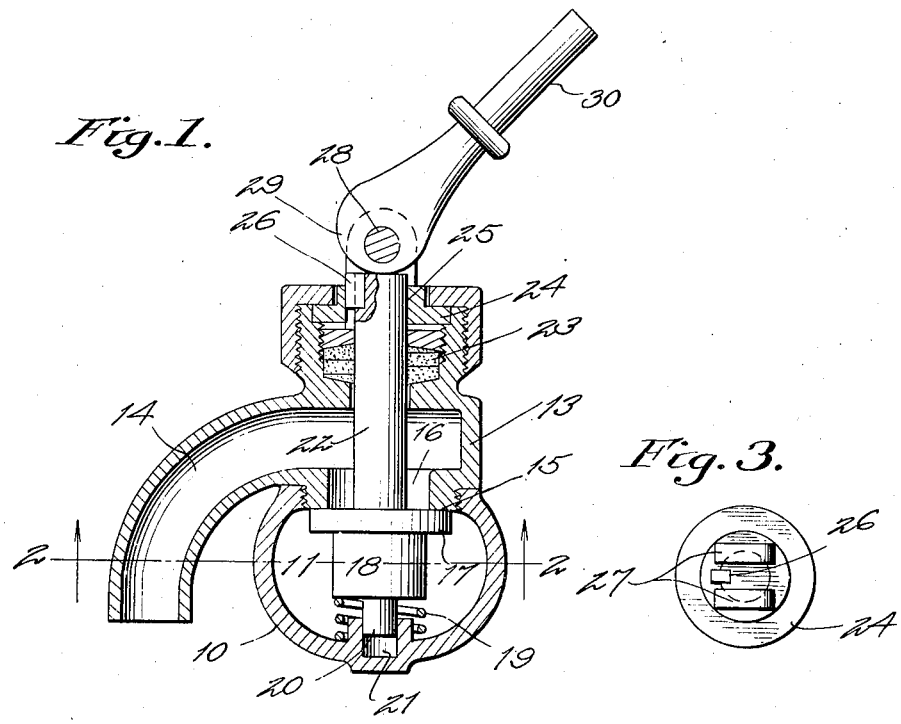
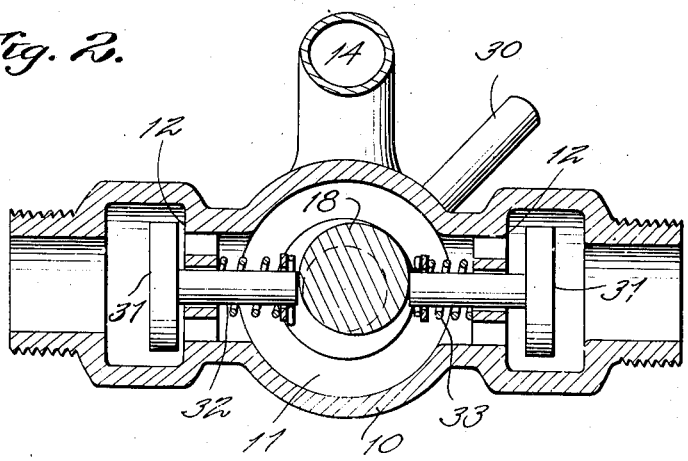
Frank Palfy,
INVENTOR
BY Victor J. Evans
ATTORNEY
R. Elvia
WITNESS Patented Mar. 16, 1926.

1,577,355

UNITED STATES PATENT OFFICE.

FRANK PALFY, OF CLEVELAND, OHIO.

MIXING VALVE.

Application filed March 21, 1925. Serial No. 17,350.

*To all whom it may concern:*

Be it known that FRANK PALFY, a citizen of the United States, residing at Cleveland, in the county of Cuyahoga and State of Ohio, has invented new and useful Improvements in Mixing Valves, of which the following is a specification.

This invention relates to improvements in valves and has especial relation to mixing valves designed for controlling the supply of hot and cold water.

An object of the present invention is to provide a valve of this character which is simple in construction, reliable in use and by means of which the mixture or temperature of the water may be conveniently regulated by a single operating handle.

With the above and other objects in view, the invention further includes the following novel features and details of construction, to be hereinafter more fully described, illustrated in the accompanying drawings and pointed out in the appended claims.

In the drawings:—

Figure 1 is a vertical transverse sectional view through a valve constructed in accordance with the invention.

Figure 2 is a horizontal section taken substantially on the line 2—2 of Figure 1.

Figure 3 is a detail plan view of the bearing disk.

Referring to the drawings in detail wherein like characters of reference denote corresponding parts, the reference character 10 indicates the casing of the valve which includes a central mixing chamber 11 upon opposite sides of which are positioned valve seats 12. The top of the mixing chamber is formed by a cap member 13 which has a threaded engagement with the mixing chamber and from which extends a discharge nozzle 14. A valve seat 15 surrounds an opening or port 16, the latter providing communication between the mixing chamber and the discharge nozzle 14.

The valve seat 15 is normally engaged by a disk valve 17 which carries an eccentric 18. A spring 19 which bears against this eccentric acts to yieldingly hold the valve upon the seat. Extending from the eccentric 18 is a stud 20 which is mounted within a bearing socket 21 and acts to hold the valve centered and permits of both rotary and axial movement of the valve.

Extending from the valve 17 is a stem 22 which projects upward through a suitable stuffing box 23, while seated within this stuffing box is a bearing disk 24. This disk is provided with a central opening 25 for the passage of the stem 22 and the latter has a feather and spline engagement with the disk 24 as indicated at 26. The valve stem may thus be axially operated independently of the disk 24 but rotation of the disk will also rotate the valve stem.

Extending from the disk 24 upon opposite sides of the stem 22 are apertured ears 27 and pivotally mounted upon a pin 28 between these ears is the eccentric head 29 of an operating handle 30. By moving the handle upon the pivot pin 28, the valve stem may be depressed against the action of the spring 19, or the handle may be utilized to rotate the valve.

The valve seats 12 which are disposed laterally upon opposite sides of the central valve seat 15 are normally engaged by disk valves 31, the latter having stems 32 which extend inwardly and engage the eccentric 18, being held in engaged position by means of springs 33.

One of the valves 31 may control a supply of hot water and the other valve 31 a supply of cold water and by rotating the operating handle 30 either of the valves may be unseated to admit a supply of either hot or cold water to the mixing chamber. If desired, both valves 31 may be unseated by operating the handle 30 so that a supply of both hot and cold water is admitted to the mixing chamber and the temperature of this water may be regulated by the degree of rotation of the handle. By moving the handle pivotally, the valve stem 22 may be depressed to unseat the valve 17 so that the water from the mixing chamber may pass out through the nozzle 14.

The invention is susceptible of various changes in its form, proportions and minor details of construction and the right is herein reserved to make such changes as properly fall within the scope of the appended claims.

Having described the invention what is claimed is:—

1. A mixing valve comprising a casing, a central normally seated spring actuated valve mounted for rotary and axial movement therein, laterally disposed normally seated spring actuated valves upon opposite sides of the central valve, an eccentric carried by the central valve, stems carried by the lateral valves and engaging the eccentric to operate said valves when the central valve is rotated, a stem extending from the central valve and means engaging the stem to rotate and move said stem axially and control the lateral and central valves.

2. A mixing valve comprising a casing, a central normally seated spring actuated valve mounted for rotary and axial movement therein, laterally disposed normally seated spring actuated valves upon opposite sides of the central valve, an eccentric carried by the central valve, stems carried by the lateral valves and engaging the eccentric to operate said valves when the central valve is rotated, a stem extending from the central valve, an apertured disk mounted within the casing and receiving the stem of the central valve, a longitudinally slidable engagement between the said stem and disk, spaced ears carried by the disk and an eccentric handle mounted between the ears and engaging the central valve stem to rotate and move said central stem axially and control the lateral and central valves.

In testimony whereof I affix my signature.

FRANK PALFY.